Figure 1:
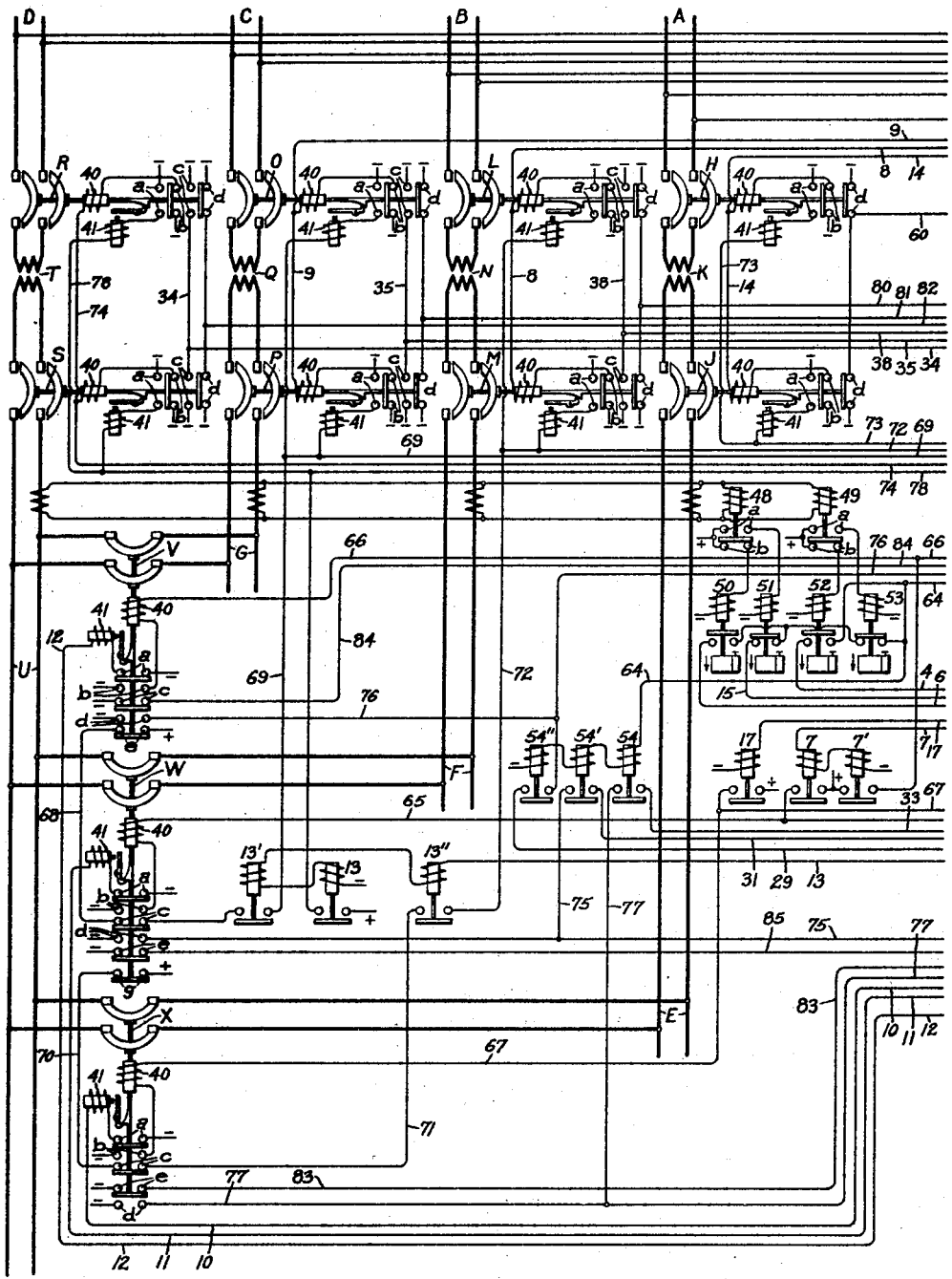

April 8, 1930.  D. R. MacLEOD ET AL  1,754,027
AUTOMATIC CONTROL SYSTEM
Filed March 21, 1927   2 Sheets-Sheet 1

Inventors:
Donald R. MacLeod,
Frederic D. King,
Eugene L. Hough,
by
Their Attorney.

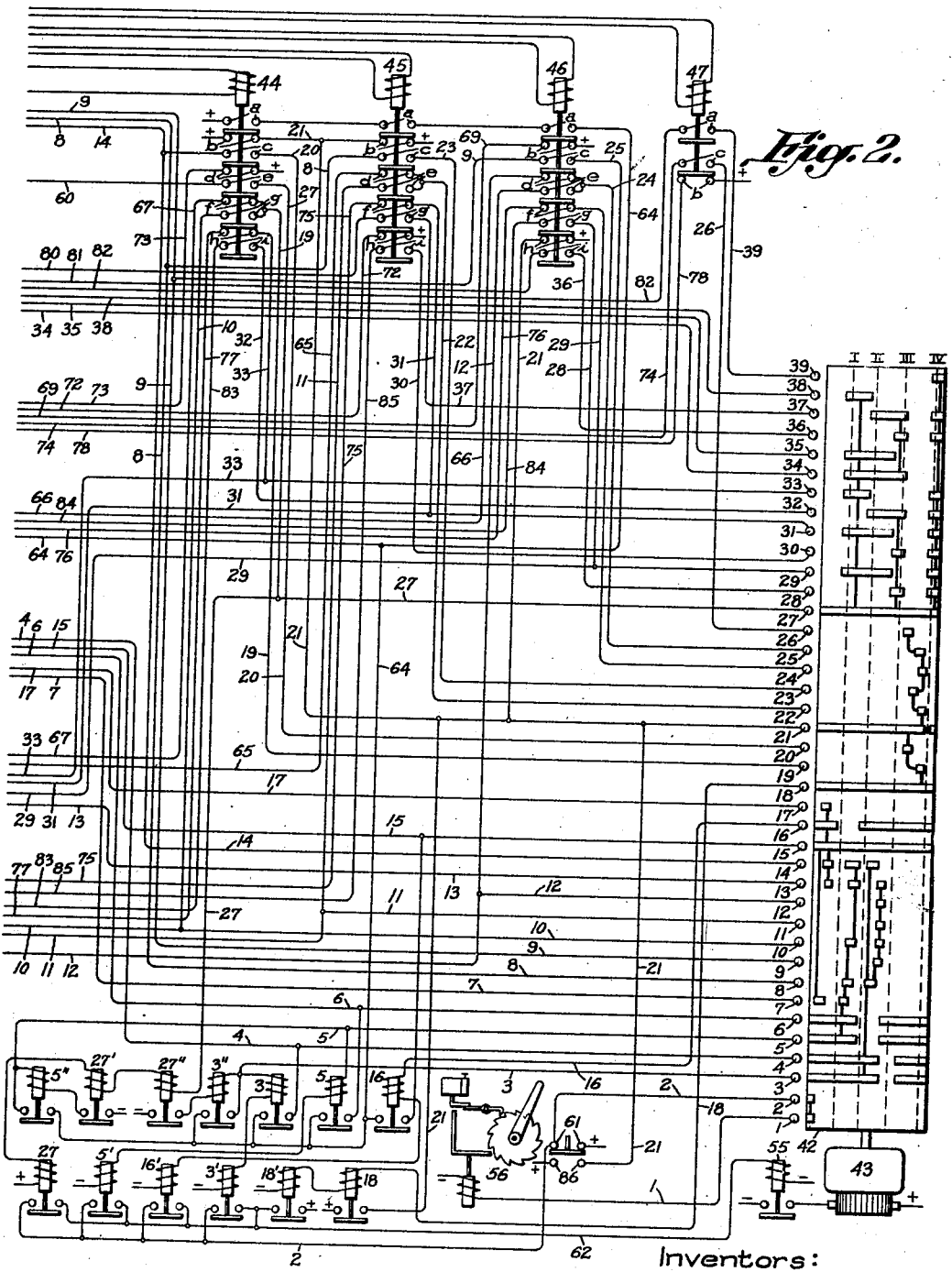

Patented Apr. 8, 1930

1,754,027

UNITED STATES PATENT OFFICE

DONALD R. MacLEOD AND FREDERIC D. KING, OF SCHENECTADY, NEW YORK, AND EUGENE L. HOUGH, OF ST. LOUIS, MISSOURI, ASSIGNORS TO GENERAL ELECTRIC COMPANY, A CORPORATION OF NEW YORK

AUTOMATIC CONTROL SYSTEM

Application filed March 21, 1927. Serial No. 177,196.

Our invention relates to automatic control systems and particularly to systems for automatically controlling the connections between a plurality of sources of current and a distribution system comprising a plurality of load busses.

One object of our invention is to provide an improved automatic control system for controlling the connections between a plurality of main sources of current, an auxiliary source of current and a plurality of load busses so that the load busses are energized from the various sources in different combinations in accordance with predetermined electrical conditions of the sources and the load busses.

Another object of our invention is to provide an automatic control system for controlling the connections between a plurality of main sources of current, an auxiliary source of current, and a load bus associated with each main source whereby under different predetermined load conditions the load busses are connected to said main sources in different ways and whereby the failure of one or more of said main sources of current at any time will cause each normal main source to be connected to its respective load bus and all of the other load busses to be connected to said auxiliary source.

Our invention will be better understood from the following description taken in connection with the accompanying drawing and its scope will be pointed out in the appended claims.

In the accompanying drawing which comprises two sheets which are designated Figs. 1 and 2 respectively and which when joined together diagrammatically show an electric system embodying our invention, we disclose our invention in connection with an electric system comprising three main supply lines A, B and C, an auxiliary supply line D, and a distribution system comprising three main load busses E, F, and G, and an auxiliary load bus U. In order to simplify the disclosure, single-phase supply circuits and load busses have been shown, but it is to be understood that our invention is not limited to any particular number of phases. Furthermore, it is obvious that our invention is applicable to systems for controlling the connections between direct current circuits.

Suitable switching means is provided for connecting each main supply circuit to one of the main load busses, for connecting the auxiliary supply circuit to the auxiliary load bus and for connecting the auxiliary load bus to each main bus. As shown in the drawing, circuit breakers H, L, O, and R are provided for connecting the primaries of the transformers K, N, Q and T to the supply circuits A, B, C and D respectively and circuit breakers J, M, P and S are provided for connecting the secondaries of the transformers K, N, Q and T to the load busses E, F, G and U respectively. Circuit breakers V, W and X are also provided for connecting the auxiliary bus U to the main busses G, F and E respectively. Therefore, the supply circuit A is connected to the load bus E when the circuit breakers H and J are closed, the supply circuit B is connected to the load bus F when the circuit breakers L and M are closed, the supply circuit C is connected to the load bus G when the circuit breakers O and P are closed, and the supply circuit D is connected to the load bus U when the circuit breakers R and S are closed. The main load busses may be connected together by closing the circuit breakers between the respective main load busses and the auxiliary load bus U. For example all the main busses are connected together when the circuit breakers V, W and X are closed.

The circuit breakers may be of any suitable type, examples of which are well known in the art. As shown, they are of the well known latched-in type. Each circuit breaker is provided with a closing coil 40 for closing the circuit breaker, a trip coil 41 for effecting its opening, auxiliary contacts $a$, $c$, $e$ (alternate letters of the alphabet) which are closed when the circuit breaker is closed and auxiliary contacts $b$, $d$, $f$, etc., which are closed when the circuit breaker is open.

In accordance with our invention the main load bus E is arranged to be connected to the supply circuit A whenever predetermined voltage conditions exist on the supply circuit A, and to the auxiliary load bus U when either the predetermined voltage conditions do not exist on the supply circuit A or the predetermined voltage conditions do exist on the supply circuit A and the total load is less than a predetermined value. The main load bus F is arranged to be connected to the supply circuit B when the predetermined normal voltage conditions do not exist on all of the main supply lines but do exist on the supply circuit B and also when the predetermined conditions do exist on all of the main supply lines and the total load exceeds a predetermined amount, and is arranged to be connected to the auxiliary load bus U when either the predetermined voltage conditions do not exist on the supply circuit B or the predetermined voltage conditions do exist on all the main supply circuits and the total load is less than a predetermined value. The load bus G is arranged to be connected to the supply circuit C when the predetermined voltage conditions exist on all the main supply circuits and the total load exceeds a predetermined value and also when the predetermined voltage conditions do not exist on all of the other main supply circuits but do exist on the supply circuit C, and is arranged to be connected to the auxiliary load bus U whenever the predetermined voltage conditions do not exist on the supply circuit C, and when the predetermined voltage conditions exist on all of the main supply circuits and the total load is below a predetermined value. The load bus U is arranged to be connected to the auxiliary source D whenever the predetermined voltage conditions do not exist on any one of the main supply circuits, but do exist on the auxiliary supply circuit.

Therefore, when all the main sources are energized the supply circuit A supplies current to all the main load busses when the load is less than a certain value. When the load exceeds this value the supply circuit A supplies current only to load bus E and supply circuit B supplies current to busses F and G. When the total load exceeds a predetermined greater value the sources A, B and C supply current to their respective load busses. In case one or more of the main supply circuits fails at any time, each normal supply circuit supplies its respective load bus and the auxiliary source D supplies current to the load bus normally arranged to be supplied by the faulty supply circuits.

A motor operated controller 42 is provided for controlling the circuits of the closing and trip coils of the various circuit breakers so as to establish the proper connection under the different voltage and load conditions. This controller which may be of any suitable construction is shown diagrammatically as comprising a plurality of stationary contacts numbered 1 to 39 inclusive and a plurality of segments mounted on a rotatable drum which is arranged to be rotated by any suitable means such as an electric motor 43. The segments are so arranged and interconnected that they complete the necessary circuits through the stationary contacts 1 to 39 inclusive at the proper time to effect the desired operations of the various circuit breakers. In order that the conductors and relays connected to the various stationary contacts of the controller may be easily found in different parts of the drawings, these conductors and relays are designated by the same numbers as the respective contacts. For example, relays 13, 13' and 13'' are connected by conductor 13 to contact 13 of the controller.

As shown in the drawing the controller 42 is arranged to stop in four different positions designated by the Roman numerals I to IV inclusive. The horizontal broken lines indicate the positions that the stationary contacts 1 to 39 occupy when the controller is in its four stopping positions.

The controller is arranged to be moved to position I when the main sources A, B and C are normal and the total load is less than a predetermined value. It is arranged to be moved to position II when the main sources A, B and C are normal and the total load is above said predetermined value, but less than a second predetermined value. It is arranged to be moved to position III when the main sources A, B and C are normal and the total load is above said second predetermined value. It is moved to position IV if any one of the main supply circuits fails.

The segments on the controller are so arranged that in moving from one position to another in response to a change in the voltage and load conditions the proper operations of the various circuit breakers are effected.

In order to control the operation of the controller 42 in accordance with the voltage conditions of the various supply circuits we provide the voltage relays 44, 45, 46 and 47, which are connected in any suitable manner so that they are respectively energized in accordance with the voltages of the supply circuits A, B, C and D.

The voltage relays 44, 45, 46 and 47 are arranged to close their respective contacts $a, c, e$, etc. (alternate letters of the alphabet) when the voltages of the respective supply circuits exceed predetermined values and to close their respective contacts $b, d, f$, etc., when the voltages of the respective supply circuits are below predetermined values.

In order to control the operation of the controller in accordance with the total load connected to the main load bus we provide current relays 48 and 49 which are connected to a current transformer in each of the supply circuits so that the relays are energized in accordance with the sum of the currents traversing all of the supply lines.

The current relay 48 closes its contacts $b$ when the total current supplied by all the sources decreases below a predetermined value and closes its contacts a when the total current exceeds a predetermined value. The current relay 49 closes its contacts b when the total current decreases below a predetermined value which is greater than the value at which the relay 48 closes its contacts a and closes its contacts a when the total current exceeds a predetermined value which is greater than the value at which the relay 49 closes its contacts b. The current relay 48 controls the circuits of two time relays 50 and 51 and the current relay 49 controls the circuits of two time relays 52 and 53. These time relays which may be of any suitable type, examples which are well known in the art, are arranged so that they open their respective contacts a substantially instantaneously when their respective coils are energized, but do not close their respective contacts until a predetermined time after their respective coils are deenergized. The time relays 50 to 53 inclusive are provided so that momentary fluctuation in the total current will not effect a change in the connections.

In order to control the various circuits for opening and closing the circuit breakers and for operating the controller we provide a number of control relays 3, 3', 3'', 5, 5', 5'', 7, 7', 16, 16', 17, 18, 18', 27, 27', 27'', 54, 54', and 54''. The function and operation of these control relays will be pointed out hereinafter in connection with the detailed description of the operation of the system.

In order to prevent the controller from effecting an indefinite number of revolutions due to the faulty operation of some device we provide a notching relay 56 which is connected and arranged in any suitable manner to effect the opening of the driving motor 43 of the controller in case the controller makes a predetermined number of revolutions with less than a predetermined time interval between successive revolutions.

The operation of the system shown is as follows: The apparatus is shown in the position it occupies when all of the supply circuits are deenergized. The controller 42 is in position IV and the time relays 50 and 52 are energized since the current relays 48 and 49 are deenergized. It will be assumed that the circuit breakers V, W and X are closed under these conditions.

*Connecting line A, light load conditions*

Assuming now that supply line A becomes energized so that voltage relay 44 closes its contacts a, c, etc., and that the load is such that the current relays 48 and 49 remain in the positions shown in the drawings: The closing of the contacts e of the voltage relay 44 completes a circuit for the control relays 27, 27' and 27''. This circuit includes the relays 27, 27' and 27'', conductor 27, contacts e of relay 44, conductor 60 and the parallel-connected contacts d on the circuit breakers H and J. The relays 27' and 27'' close their contacts but do not complete any circuits under the conditions assumed. The relay 27 closes its contacts and thereby completes a circuit for the control relay 55 to start the control motor 43. This circuit also includes contacts 61 of the notching relay 56 and conductors 2 and 62.

If the other main supply circuits B and C are also energized under the conditions assumed, a circuit is completed for the control relays 16 and 16' which are connected in series. This circuit includes conductor 16, controller segments and contacts 16 and 15, conductor 15, contacts of current relay 51, contacts of current relay 53, conductor 64 and the series connected contacts a of the relays 44, 45 and 46. The contacts of relay 16' are connected in parallel with the contacts of relay 27 in the circuit of the control relay 55. The relay 16 by closing its contacts connects the conductors 15 and 16 together so as to insure that the contact 15 and the relays 16 and 16' remain energized through the series connected contacts a of the relays 44, 45 and 46 until the controller reaches position I even though the load conditions should change and cause either relay 51 or 53 to open its contacts.

As the controller moves from position IV to position I it completes through its segments and contacts 15 and 17, a circuit for the series connected control relays 7 and 7'. This circuit includes the series connected contacts a of the relays 44, 45 and 46, conductor 64, contacts of relay 16, conductor 15, controller segments and contacts 15 and 7, conductor 7 and control relays 7 and 7'. The relays 7 and 7' control respectively circuits for the closing coils 40 of the circuit breakers W and V. Since these circuit breakers are closed under the conditions assumed the circuit of the closing coil 40 of the circuit breaker W is open at the contacts b on the circuit breaker W, and the circuit of the closing coil 40 of circuit breaker V is open at the contacts b on the circuit breaker V. The controller next completes through its contacts 15 and 17 a circuit for the control relay 17, which in turn controls the circuit for the closing coil 40 of the circuit breaker X. The circuit of the relay 17 includes the series connected contacts a of relays 44, 45 and 46, conductor 64, contacts of relay 16, conductor 15, controller segments and contacts 15 and 17, conductor 17, and control relay 17. Since the circuit breaker X is closed, control relay 17 does not complete the circuit of the closing coil 40 of the circuit breaker because this circuit is open at contacts b on the circuit breaker.

The controller next completes through its segments and contacts 15 and 14 circuits for the closing coils 40 of the circuit breakers H and J. These circuits include the series connected contacts *a* of relays 44, 45 and 46, conductor 64, contacts of relay 16, conductor 15, controller segments and contacts 15 and 14, conductor 14, closing coils 40 of the circuit breakers H and J and contacts *b* on the respective circuit breakers H and J. The closing of the circuit breakers H and J connects the supply circuit A to the load bus E which is already connected to the other load busses by the circuit breakers V, W, and X so that the supply circuit A supplies current to all the load busses.

The controller next completes through its segments and contacts 15 and 13, a circuit for the series connected control relays 13, 13′ and 13″. This circuit includes the series connected contacts *a* of relays 44, 45 and 46, conductor 64, contacts of relay 16, conductor 15, controller segments and contacts 15 and 13, conductor 13, and relays 13, 13′, and 13″. These control relays control the circuits of the trip coils 41 of the circuit breakers L, M, O, P, R and S, but since these circuit breakers are open under the conditions assumed and, therefore, their *a* contacts are open, the energization of these control relays at this time does not complete the circuit of any of the trip coils 41. When the controller reaches position I the circuit of the control relays 16 and 16′ is opened by the segment 16 so that the circuit of the driving motor 43 is open and the controller stops in this position.

*Supply circuit A in service. Supply circuit B connected by increasing load*

When the controller 42 is in position I so that the supply circuit A is supplying the total load and the load increases above a predetermined amount, the controller 42 is operated so that it moves to position II and in so doing effects first the connection of the supply circuit B to the load bus F so that the two supply circuits A and B are operating in parallel and then the circuit breaker X is opened so that the supply circuit A supplies current only to the load bus E and the supply circuit B supplies current to both of the load busses F and G.

These switching operations are effected in the following manner: When the load on the supply circuit A increases above a predetermined amount the current relay 48 operates to open its contacts *b*, so that the time relay 50 is deenergized, and to close its contacts *a* so that the time relay 51 is energized. The time relay 51 immediately opens its contacts, but the time relay 50 does not close its contacts until a predetermined time after its coil is deenergized. When the time relay 50 does close its contacts *a* a circuit is completed for the control relays 5 and 5′. This circuit includes the series connected *a* contacts of the relays 44, 45 and 46, conductor 64, contacts of time relays 53 and 50, conductor 6, segments and contacts 6 and 5 on the controller 42, and conductor 5.

Relay 5 connects conductors 64 and 5 together so that the contacts of the time relays 53 and 50 are shunted in order to insure that the contact 6 is energized through the series connected contacts *a* of the relays 44, 45 and 46 and that the controller will run to position II even though a change in the load should occur which causes relay 50 or 53 to open its respective contacts.

Relay 5′ connects the conductors 62 and 2 together so that the circuit of the control relay 55 is energized to effect the starting of the controller motor 43.

The controller first completes, through its segments and contacts 6 and 7, a circuit for the relays 7 and 7′, but since the circuit breakers V and W are closed the energizations of the relays 7 and 7′ do not respectively complete the circuits for the closing coils 40 of the circuit breakers W and V. The circuit of the relays 7 and 7′ includes the series connected contacts *a* of relays 44, 45 and 46, conductor 64, contacts of relay 5, conductor 6, controller segments and contacts 6 and 7, conductor 7, and relays 7 and 7′.

The controller next connects its contacts 14 and 6 together, but the circuits of the closing coils 40 of the circuit breakers H and J are not completed thereby because the circuit breakers are already closed.

The controller next completes, through its segments and contacts 6 and 8, the circuits for the closing coils 40 of the circuit breakers L and M so that the supply circuit B is connected to the load bus F. These circuits include the series connected contacts *a* of relays 44, 45 and 46, conductors 64, contacts of relay 5, conductor 6, controller segments and contacts 6 and 8, conductor 8, closing coils 40 of circuit breakers L and M, and contacts *b* of the respective circuit breakers L and M.

The controller next completes, through its segments and contacts 6 and 10, a circuit for the trip coil 41 of the circuit breaker X so that the load bus E is disconnected from the auxiliary load bus U. This circuit includes the series connected contacts *a* of relays 44, 45 and 46, conductor 64, contacts of relay 5, conductor 6, controller segments and contacts 6 and 10, conductor 10, trip coil 41 of circuit breaker X, and contacts *a* on the circuit breaker X.

The controller next completes a circuit through its contacts 13 and 6 for the control relays 13, 13′ and 13″. This circuit includes the series connected contacts *a* of relays 44, 45 and 46, conductor 64, contacts of relay 5, conductor 6, controller segments and contacts 6 and 13, conductor 13 and relays 13, 13′ and 13″. The energizations of these relays, however, do not effect the completion of any circuits at this time.

When the controller reaches position II the circuit of the relays 5 and 5′ is opened by the segments 5 and 6 so that the controller stops in this position.

*Supply circuits A and B in service. Supply circuit C connected by increasing load*

When the total load increases above a predetermined higher value the controller 42 moves from position II to position III and in so doing first effects the connection of the supply circuit C to the load bus G and then effects the opening of the circuit breakers V and W so that each of the main supply circuits supplies current only to its respective load bus.

These switching operations are effected in the following manner: When the total load increases above a predetermined amount the current relay 49 operates to open its contacts *b* so that the time relay 52 is deenergized and to close its contacts *a* so that the time relay 53 is energized. The time relay 53 opens its contacts immediately, but the time relay 52 does not close its contacts until a predetermined time after its coil is deenergized. When the relay 52 does close its contacts a circuit is completed for the control relays 3 and 3'. This circuit also includes the series-connected contacts *a* of the relays 44, 45 and 46, conductor 64, contacts of time relay 52, conductor 4, segments and contacts 4 and 3 of the controller, and conductor 3.

Relay 3 connects the conductors 64 and 4 together so that the contacts of the time relay 52 are shunted and therefore the contact 4 and relays 3 and 3' remain energized through the series connected contacts *a* of the relays 44, 45 and 46, until the controller reaches position III even though the relay 52 should open its contacts due to a change in the load.

Relay 3' connects conductor 62 and 2 together so that the control relay 55 is energized to effect the starting of the controller motor.

The controller first connects its contacts 4 and 14 together but the circuits of the closing coils 40 of the circuit breakers H and J are not completed through these contacts at this time since these circuits are open at the *b* contacts on the respective circuit breakers.

The controller next connects its contacts 4 and 8 together, but the circuits of the closing coils 40 of the circuit breakers L and M are not completed through these contacts at this time since these circuits are open at the *b* contacts on the respective circuit breakers.

The controller next connects its contacts 4 and 9 together so that the circuits for the closing coils 40 of the circuit breakers O and P are completed to connect the supply circuit C to the load bus G. These circuits include the series connected contacts *a* of relays 44, 45 and 46, conductor 64, contacts of relay 3, conductor 4, controller segments and contacts 4 and 9, conductor 9, closing coils 40 of the circuit breakers O and P, and contacts *b* on the respective circuit breakers.

The controller next connects its contacts 4 and 10 together, but the circuit of the trip coil 41 of circuit breaker X is not energized because this circuit is open at contacts *a* on the circuit breaker X.

The controller next connects its contacts 4 and 11 together so that the circuit for the trip coil 41 of the circuit breaker W is completed. This circuit includes the series connected contacts *a* of relays 44, 45 and 46, conductor 64, contacts of relay 3, conductor 4, controller segments and contacts 4 and 11, conductor 11, trip coil 41 of circuit breaker W, and contacts *a* on the circuit breaker. The circuit breaker W opens and disconnects the load bus F from the auxiliary load bus U.

The controller next connects its contacts 4 and 12 together so that the circuit for the trip coil 41 of the circuit breaker V is completed. This circuit includes the series connected contacts *a* of relays 44, 45 and 46, conductor 64, contacts of relay 3, conductor 4, controller segments and contacts 4 and 12, conductor 12, trip coil 41 of circuit breaker V and contacts *a* on the circuit breaker V. The circuit breaker V opens and disconnects the load bus G from the auxiliary load bus U.

Each of the main supply lines now supplies current only to its respective load bus.

The controller next connects its contacts 4 and 13 together so that the relays 13, 13' and 13'' are energized, but their energizations do not effect the completion of any circuits at this time under the conditions assumed. The circuit of the relays 13, 13' and 13'' includes the series connected contacts *a* of relays 44, 45 and 46, conductor 64, contacts of relay 3, conductor 4, controller segments and contacts 4 and 13, conductor 13 and relays 13, 13' and 13''.

When the controller reaches position III the circuit of the relays 3 and 3' is opened by the segments 3 and 4 so that the controller stops in this position.

*Circuits A, B and C in service. C disconnected on underload*

When the three supply circuits A, B and C are supplying current to their respective load busses E, F and G and the load decreases so that it can be supplied by two supply circuits, the controller 42 moves from position III to position II and in so doing first effects the closing of the circuit breakers V and W so that both of the load busses F and G are connected to the auxiliary bus U and then effects the opening of the circuit breakers O and P so as to disconnect the supply circuit C from the load bus G.

This switching operation is effected as follows: When the total load decreases below a predetermined value, current relay 49 opens its contacts *a*, thereby opening the circuit of time relay 53, and closes its contacts *b*, thereby closing the circuit of the time relay 52. Time relay 52 opens its contacts immediately, but the time relay 53 does not close its contacts until a predetermined time after its coil is deenergized.

When time relay 53 does close its contacts the heretofore described circuit for the control relays 5 and 5' is completed through the controller segments 5 and 6 so that the controller moves from position III through positions IV and I to position II. No switching operations are effected by the controller while moving from position IV to position I under the assumed conditions.

While moving from position I to position II the controller first completes the heretofore described circuit for the control relays 7 and 7' through its segments and contacts 7 and 6. The relays 7 and 7' respectively complete the circuits of the closing coils 40 of the circuit breakers W and V so that the load busses G and F are connected to the auxiliary load bus U. The circuit of the closing coil 40 of the circuit breaker W includes the contacts of the relay 7, conductor 65 and the contacts b on the circuit breaker W and the circuit of the closing coil 40 of the circuit breaker V includes the contacts of the relay 7', conductor 66 and contact b on the circuit breaker V.

The controller next completes, through its contacts 6 and 13 the heretofore described circuit for the control relays 13, 13' and 13''. The energizations of the control relays 13 and 13'' do not effect the completion of any circuits under the conditions assumed. The energization of the control relay 13', however, completes the circuits for the trip coils 41 of the circuit breakers O and P so that the supply circuit C is disconnected from the load bus G. The circuits of the trip coils 41 of the circuit breakers O and P include the contacts e on the circuit breaker V, conductor 68, contacts c on circuit breaker W, contacts of relay 13', conductor 69, trip coils 41 of circuit breakers O and P and contacts a on the respective circuit breakers O and P. Supply circuit A is now connected only to load bus E and supply circuit B is connected to both of the load busses F and G.

When the controller reaches position II the circuits of the relays 5 and 5' are opened by the segments 5 and 6 so that the controller stops in this position.

*Circuits A and B in service. B disconnected on underload.*

When the controller is in position II so that supply circuit A is connected only to the load bus E and the supply circuit B is connected to both of the load busses F and G, and the total load decreases so that it can be supplied by the supply circuit A alone, the controller 42 is started and moves from position II through positions III and IV to position I and in so doing first effects the closing of the circuit breaker X so that the load bus E is connected to the auxiliary load bus U and then effects the opening of the circuit breakers L and M so that the supply line B is disconnected from the load bus F.

These switching operations are effected as follows: When the total load decreases below a predetermined value, the current relay 48 opens its contacts a, thereby opening the circuit of the time relay 51, and closes its contacts b, thereby completing the circuit of the time relay 50. Time relay 50 opens its contacts immediately but the time relay 51 does not close its contacts until a predetermined time after its coil is deenergized.

The time relay 51 by closing its contacts completes the heretofore described circuit of the control relays 16 and 16' through the series connected contacts a of the relays 44, 45 and 46, conductor 64, contacts of time relays 53 and 51, conductor 15, controller segments and contacts 15 and 16, conductor 16 and relays 16 and 16' so that the controller motor is energized and moves out of position II. The relay 16 completes the heretofore locking circuit for itself so as to insure that the controller reaches position I before the relays 16 and 16' are deenergized.

No switching operations are effected by the controller while moving from position II to position IV under the conditions assumed.

While moving from position IV to position I the controller completes through its segments and contacts 15 and 7 the heretofore described circuit for the control relays 7 and 7' but since the circuit breakers V and W are closed the energization of these control relays does not effect the completion of any circuits under the assumed conditions.

The controller next completes through its segments and contacts 15 and 17 the heretofore described circuit for the control relay 17 which in turn completes the circuit for the closing coil 40 of the circuit breaker X so that the load bus E is connected to the auxiliary load bus U. The circuit of the closing coil 40 of the circuit breaker X includes contacts of the control relay 17, conductor 67 and contacts b on the circuit breaker X.

The controller next completes the heretofore described circuit for the relays 13, 13' and 13''. The energizations of the relays 13 and 13' do not effect the completion of any circuits at this time. The energization of the relay 13'', however, completes the circuit of the trip coils 41 of the circuit breakers L and M so that the supply circuit B is disconnected from the load bus F. The circuits of the trip coils include the contacts g on circuit breaker W, conductor 70, contacts c on circuit breaker X, conductor 71, contacts of relay 13'', conductor 72, and the contacts a on the respective circuit breakers.

All of the main load busses are now supplied from the supply circuit A alone.

*Circuit A fails while circuits B, C and D are normal*

The failure of the supply circuit A at any time effects the immediate opening of the circuit breakers H and J so that the supply circuit A is disconnected from the load bus E and causes the controller to move from whatever position it may be in to position IV where it stops. Under the assumed conditions no switching operations are effected by the controller while moving from whatever position it may be in to position III. While moving from position III to IV the controller effects the closing of any of the circuit breakers L, M, O, P, R, S, and X that may open and the opening of the circuit breakers V and W if they are closed.

These switching operations are effected in the following manner: Whenever the supply circuit A fails so that the voltage relay 44 closes its contacts $b$, $d$, $f$ and $h$, circuits are completed for the trip coils 41 of the circuit breakers H and J through contacts $d$ of the relay 44, conductor 73, and contacts $a$ on the respective circuit breakers. The circuit breakers H and J therefore are opened immediately to disconnect the faulty supply circuit A from the load bus E.

The closing of the contacts $b$ of the relay 44 completes a circuit for the control relays 18 and 18′ to effect the movement of the controller from whatever position it may be in to position IV. The circuit of the relays 18 and 18′ includes contacts $b$ of relay 44, conductor 21, segments and contacts 21 and 18 of the controller, and conductor 18. The relay 18 by closing its contacts completes a locking circuit for itself which is independent of the contacts $b$ of the relay 44 so that the contact 21 and the relays 18 and 18′ remain energized until the controller reaches position IV even though the voltage on the supply circuit A may be restored to normal while this movement of the controller is taking place. The relay 18′ completes a circuit of the control relay 55 so that the controller motor 43 is energized to start the controller.

The controller does not effect any change in the connections of the supply circuits and load busses until the controller leaves position III. The controller then completes, through its contacts 21 and 26, circuits for the closing coils 40 of the circuit breakers R and S if these circuit breakers are open so that they are closed to connect the auxiliary main source D to the auxiliary load bus U. These circuits include contacts of relay 18, conductor 21, controller segments and contacts 21 and 26, conductor 26, contacts $c$ of the voltage relay 47, conductor 74, closing coils 40 of circuit breakers R and S and contacts $b$ on the respective circuit breakers R and S.

The controller next completes through its contacts 21 and 23 circuits for the closing coils 40 of the circuit breakers L and M, if these circuit breakers are open and the supply circuit B is normal, so that the supply circuit B is connected to the load bus F. These circuits include contacts of relay 18, conductor 21, controller segments and contacts 21 and 23, conductor 23, contacts $c$ of the relay 45, conductor 8, and closing coils 40 of circuit breakers L and M, and contacts $b$ on the respective circuit breakers L and M.

The controller next completes, through its contacts 21 and 25, circuits for the closing coils 40 of the circuit breakers O and P, if these circuit breakers are open and the supply circuit C is normal, so that the supply circuit C is connected to the load bus G. These circuits include contacts of relay 18, conductor 21, controller segments and contacts 21 and 25, conductor 25, contacts $c$ of relay 45, conductor 9, closing coils 40 of circuit breakers O and P, and contacts $b$ on the respective circuit breakers O and P.

The controller next completes, through its contacts 21 and 19, a circuit for the closing coil 40 of the circuit breaker X if this circuit breaker is open so that load bus E is connected to the auxiliary load bus U. This circuit includes contacts of relay 18, conductor 21, controller segments and contacts 21 and 19, conductor 19, contacts $f$ of relay 44, conductor 67, closing coil 40 of circuit breaker X, and contacts $b$ on the circuit breaker X.

The controller next completes, through its contacts 21 and 22, a circuit for the trip coil 41 of the circuit breaker W, if this circuit breaker is closed, so that the load bus F is disconnected from the auxiliary bus U. This circuit includes contacts of relay 18, conductor 21, controller segments and contacts 21 and 22, conductor 22, contacts $e$ of relay 45, conductor 11, trip coil 41 of circuit breaker W, and contacts $a$ on the circuit breaker W.

The controller next completes, through its contacts 21 and 24, a circuit for the trip coil 41 of the circuit breaker V, if this circuit breaker is closed, so that the load bus G is disconnected from the auxiliary bus U. This circuit includes contacts of relay 18, conductor 21, controller segments and contacts 21 and 24, conductor 24, contacts $e$ of the relay 46, conductor 12, trip coil 41 of circuit breaker V, and contacts $a$ on the circuit breaker V.

When the controller reaches position IV the circuits of the relays 18 and 18′ are opened by the break in the segment 21 so that, under the conditions assumed, the controller stops in this position.

It will be observed that now the normal main supply circuits B and C are respectively connected to the load busses F and G and the auxiliary main supply circuit D is connected to the load bus E.

*Circuit B fails while circuits A, C and D are normal*

The failure of the supply circuit B at any time effects the immediate opening of the circuit breakers L and M, if these circuit breakers are closed, so that the supply circuit B is disconnected from the load bus F, and causes the controller to move from whatever position it may be in to position IV where it stops. Under the assumed conditions the controller effects, while moving from position III to position IV, the closing of any of the circuit breakers H, J, O, P, R, S, and W that may be open and the opening of the circuit breakers X and V if they are closed.

These switching operations are effected in the following manner: When the supply circuit B fails so that the relay 45 closes its contacts $b$, $d$, $f$ and $h$, circuits are immediately completed for the trip coils 41 of the circuit breakers L and M if these circuit breakers are closed. These circuits include contacts $h$ of the relay 45, conductor 72, trip coils 41 of the circuit breakers L and M, and contacts $a$ on the respective circuit breakers L and M. Therefore, if the circuit breakers L and M are closed when the supply circuit B fails, they are opened immediately to disconnect the faulty supply circuit B from the load bus F.

The closing of the $b$ contacts of the relay 45, which are in parallel with the $b$ contacts of the relay 44, completes a circuit for the control relays 18 and 18′ which operate in the manner heretofore described to effect the movement of the controller from whatever position it may be in to position IV. The energizing circuit of these relays includes the contacts $b$ of relay 45, conductor 21, segments and contacts 21 and 18 of the controller, and conductor 18. Control relay 18 completes the heretofore described locking circuit for itself.

The controller does not effect any change in the connections of the supply circuits and the load busses until the controller leaves position III. Then it effects in the manner heretofore described in connection with the failure of the supply circuit A the closing of the circuit breakers R and S when the controller connects its contacts 21 and 26 together, the closing of the circuit breakers O and P if they are open when the controller connects its contacts 21 and 25 together, and the opening of the circuit breaker V if it is closed when the controller connects its contacts 21 and 24 together.

Under the conditions now assumed the connecting of the contacts 21 and 20 of the controller together when it moves from position III to position IV does not effect the completion of any circuit since the circuit breakers H and J are closed and therefore the circuits of their closing coils 40 are open at their respective contacts $b$. The connecting of the contacts 21 and 23 together does not effect the completion of any circuit because the contacts $c$ of the relay 45 are open. The connecting of the contacts 21 and 19 together completes a circuit for the trip coil 41 of the circuit breaker X if this circuit breaker is closed. This circuit includes contacts of relay 18, conductor 21, controller segments and contacts 21 and 19, conductor 19, contacts $g$ of the relay 44, conductor 10, trip coil 41 of circuit breaker X, and contacts $a$ on the circuit breaker X. The connecting of the contacts 21 and 22 together completes a circuit for the closing coil 40 of the circuit breaker W if this circuit breaker is open so that the load busses F and U are connected together. This circuit includes contacts of relay 18, conductor 21, controller segments and contacts 21 and 22, conductor 22, contact $d$ of relay 45, conductor 65, closing coil of circuit breaker W, and contacts $b$ on the circuit breaker W.

Therefore, when the controller reaches position IV under the conditions assumed the main supply circuits A and C respectively supply current to the load busses E and G and the auxiliary source D supplies current to the load bus F.

*Circuit C fails while circuits A, B and D are normal*

The failure of the supply circuit C at any time effects the immediate opening of the circuit breakers O and P if these circuit breakers are closed, so that supply circuit C is disconnected from the load bus G and causes the controller to move from whatever position it may be in to position IV where it stops. Under the assumed conditions the controller effects, while moving from position III to position IV, the closing of any of the circuit breakers H, J, L, M, R, S and V which may be open and the opening of the circuit breakers X and W if they are closed.

These switching operations are effected in the following manner: When the supply circuit C fails so that the relay 46 closes its contacts $b$, $d$, $f$ and $h$, circuits are immediately completed for the trip coils 41 of the circuit breakers O and P if these circuit breakers are closed. These circuits include contacts $b$ of the relay 46, conductor 69, trip coil 41 of the circuit breakers O and P and contacts $a$ on the respective circuit breakers. Therefore, if the circuit breakers O and P are closed when the supply circuit C fails, they are opened immediately to disconnect the faulty supply circuit C from the load bus G.

The closing of the $h$ contacts of the relay 46, which are in parallel with the $b$ contacts of the relays 44 and 45, completes the circuit of the control relays 18 and 18′, which operates in the manner heretofore described to effect the movement of the controller from whatever position it may be in to position IV. The energizing circuit of these control relays 18 and 18' includes the contacts $h$ of the relay 46, conductor 21, segments and contacts 21 and 18 of the controller and conductor 18. Control relay 18 completes the heretofore described locking circuit for itself.

The controller does not effect any change in the connections of the supply circuits and the load busses until the controller leaves position III. Then it effects, in the manner heretofore described in connection with the failure of the supply circuits A and B, the closing of the circuit breakers R and S if these circuit breakers are open when the controller connects its contacts 21 and 26 together, the closing of the circuit breakers L and M if these circuit breakers are open when the controller connects its contacts 21 and 23 together, the opening of the circuit breaker W if this circuit breaker is closed when the controller connects its contacts 21 and 22 together, and the opening of the circuit breaker X if this circuit breaker is closed when the controller connects its contacts 21 and 19.

Under the conditions now assumed the connecting of the contacts 21 and 20 of the controller together when it is moving from position III to position IV does not effect the completion of any circuit since the circuit breakers H and J are closed and therefore the circuits of their closing coils 40 are open at their respective contacts $b$. The connecting of the contacts 21 and 25 together does not complete any circuit because the contacts $c$ of the relay 46 are open. The connecting of the contacts 21 and 24 together completes a circuit for the closing coil 40 of the circuit breaker V so that the load busses U and G are connected together. This circuit includes contacts of relay 18, conductor 21, controller segments and contacts 21 and 24, conductor 24, contacts $d$ of relay 46, conductor 66, closing coil 40 of circuit breaker V and contacts $b$ on the circuit breaker V.

Therefore when the controller reaches position IV under the conditions assumed the main supply circuits A and B respectively supply current to the load busses E and F and the auxiliary source D supplies current to the load bus G.

*Circuit B fails and only circuits C and D are normal*

It will now be assumed that after the supply circuit D has been placed in service due to the failure of the supply circuit A, the supply circuit B fails. Under the assumed conditions the controller is in position IV, the supply circuits B, C and D are respectively connected to the load busses F, G and E when the supply circuit B fails. The failure of the supply circuit B under the assumed conditions effects the immediate opening of the circuit breakers L and M so that the supply circuit B is disconnected from the load bus F and then effects one complete revolution of the controller 42 during which the circuit breaker W is closed to connect the load bus F to the auxiliary load bus U so that auxiliary supply circuit D also supplies current to the load bus F.

These switching operations are effected in the following manner: The closing of the contacts $h$ of the relay 45 when the supply circuit B fails completes the heretofore described circuits for the tripping coils 41 of the circuit breakers L and M, so that the faulty supply circuit B is immediately disconnected from the load bus F. The closing of the contacts $f$ of the relay 45 completes a circuit for the control relays 27, 27' and 27''. This circuit includes the control relays 27, 27' and 27'', conductor 27, segments and contacts 27 and 31 of the controller, conductor 31, contacts $f$ of the relay 45, conductor 75, and contacts $d$ on the circuit breaker W.

The energizations of relays 27' and 27'' do not effect the completion of any circuits at this time, but the energization of the relay 27 effects the energization of the control relay 55 in a manner heretofore described so that the controller moves out of position IV. As soon as the controller leaves position IV the heretofore described circuit for the relays 18 and 18' is completed through the $b$ contacts of the relay 45 so that the controller continues to rotate until it again reaches position IV. In moving from position III to position IV the heretofore described circuit for the closing coil 40 of the circuit breaker W is completed through the contacts of relay 18, conductor 21, segments and contacts 21 and 22 of the controller, conductor 22, contacts $d$ of relay 45, conductor 65, closing coil 40 of circuit breaker W and contacts $b$ on the circuit breaker W so that when the controller again reaches position IV the above described circuit for relays 27, 27' and 27'' is open at the $d$ contacts of the circuit breaker W and therefore the controller remains in this position.

The closing of circuit breaker W connects the load busses U and F together so that now the auxiliary supply circuit D supplies current to both of the load busses E and F and the normal supply circuit C supplies current to the load bus G.

*Circuit C fails and only circuits B and D are normal*

It will now be assumed that after the supply circuit D has been placed in service due to the failure of the supply circuit A, the supply circuit C fails. Under the assumed conditions the controller is in position IV and the circuit breakers L, M, O, P, R, S and X are closed when the supply circuit C fails. The failure of the supply circuit C effects the immediate opening of the circuit breakers O and P so that the supply circuit C is disconnected from the load bus G and effects one complete revolution of the controller during which the circuit breaker V is closed.

These switching operations are effected in the following manner: The closing of contacts *b* of the relay 46 when the supply circuit C fails completes the heretofore described circuits for the trip coils 41 of the circuit breakers O and P so that the faulty circuit C is immediately disconnected from the load bus G. The closing of the contacts *f* of the relay 46 completes a circuit for the control relays 27, 27' and 27''. This circuit includes the control relays 27, 27' and 27'', conductor 27, segments and contacts 27 and 29 of the controller, conductor 29, contacts *f* of the relay 46, conductor 76, and contacts *d* on the circuit breaker V.

The energizations of the relays 27' and 27'' do not effect the completion of any connections at this time, but the energization of the relay 27 effects the energization of the control relay 55 in a manner heretofore described so that the controller is started and moves out of position IV. As soon as the controller leaves position IV the heretofore described circuit for the relays 18 and 18' is completed through the *h* contacts of the relay 46 and the controller segments and contacts 21 and 18, so that the controller continues to rotate until it again reaches position IV. In moving from position III to position IV the heretofore described circuit for the closing coil 40 of the circuit breaker V is completed through contacts of relay 18, conductor 21, segments and contacts 21 and 24 of the controller, conductor 24, the contacts *d* of relay 46, conductor 66, closing coil 40 of circuit breaker V and contacts *b* on the circuit breaker V so that the circuit breaker V is closed. Therefore when the controller again reaches position IV the above described circuit for the relays 27, 27' and 27'' is open at contacts *d* on the circuit breaker V and the controller stops in this position.

The closing of the circuit breaker V connects the load busses U and G together so that now the auxiliary supply circuit D supplies current to both of the load busses E and G and the normal supply circuit B supplies current to the load bus F.

*Circuit A fails and only circuits C and D are normal*

It will now be assumed that while the controller is in position IV and the circuit breakers H, J, O, P, R, S and W are closed so that the supply circuits A, C and D are respectively supplying current to load busses E, G and F, the supply circuit A fails. Under these conditions the failure of the supply circuit A effects the immediate opening of the circuit breakers H and J so that the supply circuit A is disconnected from the load bus E and effects one complete revolution of the controller during which the circuit breaker X is closed.

These switching operations are effected in the following manner: The closing of contacts *d* of the relay 44 when the supply circuit A fails completes the heretofore described circuits for the trip coils 41 of the circuit breakers H and J, so that the faulty circuit A is immediately disconnected from the load bus E. The closing of the contacts *h* of the relay 44 completes a circuit for the relays 27, 27' and 27''. This circuit includes the control relays 27, 27' and 27'', conductor 27, segments and contacts 27 and 33 of the controller, conductor 33, contacts *h* of relay 44, conductor 77 and contacts *d* of the circuit breaker X.

The energizations of the relays 27' and 27'' do not effect the completion of any connections at this time, but the energization of the relay 27 effects the energization of the control relay 55 in a manner heretofore described so that the controller is started and moves out of position IV. As soon as the controller leaves position IV the heretofore described circuit for the relays 18 and 18' is completed through the contacts *b* of the relay 44 so that the controller continues to rotate until it again reaches position IV. In moving from position III to position IV the heretofore described circuit for the closing coil 40 of the circuit breaker W is completed through contacts of relay 18, conductor 21, segment and contacts 21 and 19 of the controller, conductor 19 and contacts *f* of the relay 44, conductor 67, closing coil 40 of the circuit breaker X, and contacts *b* on circuit breaker X, so that the circuit breaker X is closed. Therefore when the controller reaches position IV the above described circuit for the relays 27, 27' and 27'' is open at contacts *d* of the circuit breaker W and the controller stops in this position.

The closing of the circuit breaker W connects the load busses U and E together so that now the auxiliary supply circuit D supplies current to both of the load busses E and F and the normal main supply circuit C supplies current to the load bus G.

*Circuit C fails and only circuits A and D are normal*

It will now be assumed that while the controller is in position IV and the circuit breakers H, J, O, P, R, S and W are closed so that the supply circuits A, C and D are respectively supplying current to load busses E, G and F the supply circuit C fails.

Under these conditions the failure of the supply circuit C causes the relay 46 to close its contacts *b*, *d*, *f* and *h* so that the circuit breakers O and P are immediately opened and the controller is operated to effect the closing of the circuit breaker V in exactly the same manner as when the supply circuit C fails and only the circuits B and D are normal. Further detailed descriptions of these switching operations is believed to be unnecessary as they are effected in the same manner as described above under the heading "Circuit C fails and only circuits B and D are normal."

Therefore, under the assumed conditions the faulty supply circuit C is disconnected from the load bus G and the load bus G is connected to the load bus U so that the auxiliary supply circuit D supplies current to both of the load busses F and G and the normal main supply circuit A supplies current to the load bus E.

*Circuit A fails and only circuits B and D are normal*

It will now be assumed that while the controller is in position IV and the circuit breakers H, J, L, M, R, S and V are closed so that the supply circuits A, B and D are respectively supplying current to load busses E, F and G the supply circuit A fails.

Under these conditions the failure of the supply circuit A causes the relay 44 to close its contacts $b$, $d$, $f$ and $h$ so that the circuit breakers H and J are immediately opened and the controller is operated to effect the closing of the circuit breaker X in exactly the same manner as when the supply circuit A fails and only the supply circuits C and D are normal. Further description of these switching operations is believed to be unnecessary as they are effected in the same manner as described above under the heading "Circuit A fails and only circuits C and D are normal."

Therefore, under the assumed conditions, the faulty supply circuit A is disconnected from the load bus E and the load bus E is connected to the load bus U so that the auxiliary supply circuit D supplies current to both of the load busses E and G and the normal main supply circuit B supplies current to the load bus F.

*Circuit B fails and only circuits A and D are normal*

It will now be assumed that while the controller is in position IV and the circuit breakers H, J, L, M, R, S and V are closed so that the supply circuits A, B and D are respectively supplying current to load busses E, F and G, the supply circuit B fails.

Under these conditions the failure of the supply circuit B causes relay 45 to close its contacts $b$, $d$, $f$ and $h$ so that the circuit breakers L and M are immediately opened and the controller is operated to effect the closing of the circuit breaker W in exactly the same manner as when the supply circuit B fails and only the supply circuits C and D are normal. Further description of these switching operations is believed to be unnecessary as they are effected in the same manner as described above under the heading "Circuit B fails and only circuits C and D are normal."

Therefore, under the assumed conditions, the faulty supply circuit B is disconnected from the load bus F and the load busses F and U are connected together so that the auxiliary supply circuit D supplies current to both of the load busses F and G and the normal main supply circuit A supplies current to the load bus E.

*Circuit A fails and only circuit D is normal*

It will now be assumed that while the controller is in position IV and the circuit breakers H, J, R, S, V and W are closed so that the main supply circuit A is supplying current to the load bus E and the auxiliary supply circuit D is supplying current to the load busses F and G, the main supply circuit A fails.

Under these conditions the failure of the supply circuit A causes the relay 44 to close its contacts $b$, $d$, $f$ and $h$ so that the circuit breakers H and J are immediately opened and the controller is operated to effect the closing of the circuit breaker X. These switching operations are effected in exactly the same manner as described above under the heading "Circuit A fails and only circuits C and D are normal."

Therefore, under the assumed conditions the faulty circuit A is immediately disconnected from the load bus E and load busses E and U are connected together so that the auxiliary supply circuit D supplies current to all of the main load busses E, F and G.

*Circuit B fails and only circuit D is normal*

It will now be assumed that while the controller is in position IV and the circuit breakers L, M, R, S, V and X are closed so that the main supply circuit B is supplying current to the load bus F and the auxiliary supply circuit D is supplying current to the load busses E and G, the supply circuit B fails.

Under these conditions the failure of the supply circuit B causes the relay 45 to close its contacts $b$, $d$, $f$ and $h$ so that the circuit breakers L and M are immediately opened and the controller is operated to effect the closing of the circuit breaker W. These switching operations are effected in exactly the same manner as described above under the heading "Circuit B fails and only circuits C and D are normal."

Therefore, under the assumed conditions the faulty circuit B is immediately disconnected from the load bus F and the load busses F and U are connected together so that the auxiliary supply circuit D supplies current to all of the main load busses E, F and G.

*Circuit C fails and only circuit D is normal*

It will now be assumed that while the controller is in position IV and the circuit breakers O, P, R, S, W and X are closed so that the main supply circuit C is supplying current to the load bus G and the auxiliary supply circuit D is supplying current to the load busses E and F, the main supply circuit C fails.

Under these conditions the failure of the supply circuit C causes relay 46 to close its contacts $b$, $d$, $f$ and $h$ so that the circuit breakers O and P are immediately opened and the controller is operated to effect the closing of the circuit breaker V. These switching operations are effected in exactly the same manner as described above under the heading "Circuit C fails and only circuits B and D are normal."

Therefore, under the assumed conditions the faulty circuit C is immediately disconnected from the load bus G and the load busses G and U are connected together so that the auxiliary supply circuit D supplies current to all of the main load busses E, F and G.

*Circuit D fails while circuits A, B and C are normal*

It will be assumed now that while main supply circuits A, B and C are normal the auxiliary supply circuit D fails. Under these conditions the failure of the supply circuit D does not effect any switching operations. Relay 47 merely opens its contacts $a$ and $c$ and closes its contacts $b$, but no circuits are completed thereby under the conditions assumed.

*Circuit D fails while supplying current to one or more of the main load busses*

It will be assumed now that while the controller is in position IV and the supply circuit D is supplying current to one or more of the main load busses the supply circuit D fails. The only switching operation that is effected under these conditions is the opening of the circuit breakers R and S so as to disconnect the faulty circuit D from the load bus U. The circuits of the trip coils 41 of the circuit breakers R and S include the contacts $b$ of the relay 47, conductor 78, trip coils 41 of circuit breakers R and S, and contacts $a$ on the respective circuit breakers R and S. Therefore, under the conditions assumed the normal supply circuits continue to supply current to their respective load busses and the load busses whose respective main sources are faulty remain deenergized.

*Circuit D not energized when a main supply circuit fails*

It will be assumed now that the auxiliary supply circuit D is not energized when one of the main supply circuits fails.

The switching operations are the same as described heretofore when the main supply circuit fails except that the circuit breakers R and S are not closed when the controller connects its contacts 21 and 26 together while moving from position III to position IV because the circuits of these closing coils are opened at the contacts $c$ of the relay 47.

Therefore, under the assumed conditions the normal supply circuits supply current to their respective load busses and the load bus whose main source fails is connected to the auxiliary load bus U, but remains deenergized because the auxiliary source D is deenergized. It will be observed therefore that when all of the supply circuits are deenergized all of the circuit breakers V, W and X are closed so that all of the load busses are connected together which was the assumption made at the beginning of the description of the operation.

*Return of voltage on circuit A*

It will now be assumed that while the controller is in position IV due to the failure of circuit A, the voltage on circuit A is restored to normal.

Under the conditions assumed the circuit breakers H and J are open when the supply circuit A is reenergized. Therefore, when the relay 44 closes its contacts $e$ due to the relay 44 being reenergized a circuit is completed for the relays 27 to effect the operation of the controller 43 in the manner heretofore described so that the controller moves out of position IV. The circuit of the relays 27 also includes the relays 27' and 27", conductor 27, contacts $e$ of relay 44, conductor 60, and contacts $d$ on the circuit breakers H and J. The various switching operations that are effected and the manner in which they are effected and the position in which the controller stops after it moves out of position IV depends upon the voltage and load conditions of the supply circuits. These various switching operations have already been described so that further description thereof is believed to be unnecessary at this time.

*Return of voltage on circuit B*

It will now be assumed that while the controller is in position IV due to the failure of supply circuit B, the voltage on supply circuit B is restored to normal.

Under the conditions assumed the circuit breakers L and M are open when the supply circuit B is reenergized. Therefore, when the relay 45 closes its contacts $g$ due to the supply circuit B being reenergized, a circuit is completed for the control relays 27, to effect the operation of the controller in the manner heretofore described so that the controller moves out of position IV. The circuit of the relay 27 includes the control relays 27' and 27", conductor 27, segments and contacts 27 and 37 of the controller, conductor 37, contacts *g* of relay 45, conductor 80, and contacts *d* on the circuit breakers L and M.

The various switching operations that are effected and the manner in which they are effected and the position in which the controller stops after it moves out of position IV depends on the voltage and load conditions of the supply circuits and have already been described so that further description thereof is believed to be unnecessary.

*Return of voltage on circuit C*

It will now be assumed that while the controller is in position IV due to the failure of supply circuit C, the voltage on supply circuit C is restored to normal.

Under the conditions assumed the circuit breakers O and P are open when the supply circuit C becomes reenergized. Therefore, when relay 46 closes its contacts *i* due to the supply circuit C being reenergized, a circuit is completed for the control relay 27 to effect the operation of the controller in the manner heretofore described so that the controller moves out of position IV. This circuit of the relays 27 also includes the relays 27' and 27'', conductor 27, segments and contacts 27 and 36 of the controller, conductor 36, contacts *i* of relay 46, conductor 81 and contacts *b* of the circuit breakers O and P.

The various switching operations that are effected and the manner in which they are effected and the position in which the controller stops after it moves out of position IV depend upon the voltage and load conditions of the supply circuits and have already been described so that further description thereof is believed to be unnecessary.

*Return of voltage on circuit D*

It will now be assumed that while the controller is in position IV and the supply circuit D is not energized, the voltage of the supply circuit D is restored to normal.

Under the conditions assumed the circuit breakers R and S are open when the supply circuit D becomes reenergized. Therefore, when relay 47 closes its contacts *a* due to the supply circuit D being reenergized, a circuit is completed for the control relay 27 to effect the operation of the controller in the manner heretofore described so that the controller moves out of position IV. This circuit of relay 27 also includes the relays 27' and 27'', conductor 27, segments and contacts 27 and 39 of the controller, conductor 39, contacts *a* of relay 47, conductor 82, and contacts *d* on the circuit breakers R and S.

The various switching operations that are effected and the manner in which they are effected and the position in which the controller stops after it moves out of position IV depend upon the voltage and load conditions of the supply circuits and have already been described so that further description thereof is believed to be unnecessary.

*Failure of a circuit breaker to function properly*

If any circuit breaker fails to open or close when it should, a circuit is completed so that the controller makes another complete revolution and during this revolution tries to effect the correct operation of the circuit breaker. If the circuit breaker again fails to function properly, the controller makes another revolution and continues to do so until the controller has made a predetermined number of revolutions when the notching relay 56 opens its contacts 61 and prevents further switching operations until the notching relay has been reset.

If when the controller reaches position I under voltage and load conditions under which it should stop in that position and any one of the circuit breakers H, J, V, W and X, which should be closed, is open, or any one of the circuit breakers L, M, O, P, R and S, which should be open, is closed, a circuit is completed for control relays 27, 27' and 27'' to effect the movement of the controller out of the position I. Similarly if any one of the circuit breakers H, J, L, M, V and W is open or any one of the circuit breakers O, P, R, S and X is closed when the controller reaches position II under voltage and load conditions that should cause it to stop in position II, or if any one of the circuit breakers H, J, L, M, O and P is open and any one of the circuit breakers R, S, V, W and X is closed when the controller reaches position III under voltage and load conditions that should cause it to stop in position III, a circuit is completed for the relays 27, 27' and 27'' to effect the movement of the controller out of that position.

The circuit of the relay 27, 27' and 27'' that is completed due to either the circuit breaker H or J being open when it should be closed in any position of the controller is through conductor 27, contacts *e* of relay 44, conductor 60 and contacts *d* on the the open circuit breaker. The circuit of these relays that is completed due to either the circuit breaker O or P being closed when it should be open in position I or II of the controller is through conductor 27, controller segments and contacts 27 and 35, conductor 35, and contacts *c* on the closed circuit breaker. The circuit of these relays that is completed due to either the circuit breaker R or S being closed when it should be open in position I, II or III of the controller is through conductor 27, controller segments and contacts 27 and 34, conductor 34, and contacts *c* on the closed circuit breaker. The circuit that is completed for these relays due to the circuit breaker W being open when it should be closed in position I or II of the controller is through conductor 27, controller segments and contacts 27 and 31, contacts of relay 54′, the circuit of which is completed through the series connected contacts *a* of relays 44, 45 and 46, conductor 75, and contacts *d* on the circuit breaker W. The circuit that is completed for these relays due to the circuit breaker W being open when it should be closed in position IV of the controller is through conductor 27, controller segments and contacts 27 and 31, conductor 31, contacts *f* of relay 45, conductor 75, and contacts *d* on the circuit breaker W. The circuit that is completed for these relays due to the circuit breaker V being open when it should be closed in position I or II of the controller is through conductor 27, controller segments and contacts 27 and 29, conductor 29, contacts of relay 54′′, the circuit of which is completed through the series connected contacts *a* of relays 44, 45 and 46, conductor 76, and contacts *d* on circuit breaker V. The circuit for these relays that is completed due to the circuit breaker V being open when it should be closed in position IV of the controller is through conductor 27, controller segments and contacts 27 and 29, conductor 29, contacts *f* of relay 46, conductor 76, and contacts *d* on circuit breaker V. The circuit for these relays that is completed due to either the circuit breaker L or M being closed when it should be open in position I of the controller is through conductor 27, controller segments and contacts 27 and 38, conductor 38, and contacts *c* on the closed circuit breaker. The circuit for these relays that is completed due to either the circuit breaker L or M being open when it should be closed in position II, III, or IV of the controller is through conductor 27, controller segments and contacts 27 and 37, conductor 37, contacts *g* of relay 45, conductor 80 and contacts *d* on the open circuit breaker. The circuit for these relays that is completed due to the circuit breaker X being closed when it should be open in position II, III, or IV of the controller is through conductor 27, controller contacts and segments 27 and 32, conductor 32, contacts *i* of relay 44, conductor 83, and contacts *e* on the circuit breaker X. The circuit for these relays that is completed due to the circuit breaker X being open when it should be closed in position I of the controller is through conductor 27, controller contacts and segments 27 and 33, conductor 33, contacts of relay 54, the circuit of which is completed through the series connected contacts *a* of relays 44, 45 and 46, conductor 77, and contacts *d* on the circuit breaker X. The circuit for these relays that is completed due to the circuit breaker X being open when it should be closed in position IV of the controller is through conductor 27, controller segments and contacts 27 and 33, conductor 33, contacts *h* of relay 44, conductor 77, and contacts *d* on the circuit breaker X. The circuit for these relays that is completed due to either the circuit breaker O or P being open when it should be closed in position III or IV of the controller is through conductor 27, controller contacts and segments 27 and 36, conductor 36, contacts *i* of relay 46, conductor 81, and contacts *d* on the open circuit breaker. The circuit for these relays that is completed due to the circuit breaker V being closed when it should be open in positions III and IV of the controller is through conductor 27, controller contacts and segments 27 and 28, conductor 28, contacts *g* of relay 46, conductor 84, and contacts *c* on the circuit breaker V. The circuit for these relays that is completed due to the circuit breaker W being closed when it should be open in positions III and IV of the controller is through conductor 27, controller contacts and segments 27 and 30, contacts *i* of relay 45, conductor 85, and conductor 30, contacts *e* on the circuit breaker W.

It will be observed, therefore, that if any circuit breaker is not in the position in which it should be under the existing voltage and load conditions when the controller reaches the predetermined position in which it should stop under the existing conditions, the controller does not stop in that position, but moves through that position and makes another complete revolution during which the proper circuits are completed in the manner heretofore described whereby an attempt is made to move the circuit breakers to their proper positions.

Each time the controller revolves, it completes, through its contacts and segments 1 and 2 a circuit for the coil of the notching relay 56. This relay which may be of any suitable type, examples of which are well known in the art, is arranged so that it opens its contacts 61 and closes its contacts 86 if its coil is energized a predetermined number of times with less than a predetermined time between successive deenergizations and reenergizations of its coil. If the time between any deenergization and the next energization of the coil is greater than said predetermined value, the notching relay is automatically restored to its normal position.

The opening of the contacts 61 of the notching relay interrupts the circuits of the control relay 55 through the contacts of relays 27, 5′, 16′ and 3′. The closing of the contacts 86 of the notching relay, however, completes a circuit for the control relays 18 and 18′ so that the controller is moved to its position IV before it is locked out. This circuit also includes conductor 21, contacts and segments 21 and 18 of the controller and conductor 18. The relay 18′ completes a circuit for the control relay 55, which is independent of the contacts 61 of the notching relay. Therefore, the controller is rotated until it reaches position IV when the circuit through the relays 18 and 18' is opened by the controller segment 21.

It will be observed that if one of the circuit breakers fails to function properly so that one or more of the load busses is not supplied with current under voltage and load conditions which would normally cause the controller to stop in position II or III, the circuit relays 48 and 49 may operate to give the wrong load indication and therefore there may be a delay in reestablishing the correction connections. For example, assume that the controller is in position I, that the supply circuit A is supplying current to all of the main load busses, and that the load increases so that current relay 48 operates to effect the deenergization of relay 50 and the energization of relay 51. The relay 50 by closing its contacts effects the movement of the controller from position I to position II and during this movement the controller completes circuits to effect the closing of the circuit breakers L and M and the opening of the circuit breaker X. If one of the circuit breakers L and M should fail to close, it will be observed that no current would be supplied to the load busses F and G after the circuit breaker X is opened and therefore the relays 48 and 49 would be energized only in accordance with the current being supplied to the load bus E. Since this current would be approximately only a third of the total load current, the current relay 48 would immediately open the circuit of the time relay 51 and close the circuit of the time relay 50. Time relay 50 would immediately open its contacts so that if no other means were provided it would be necessary to wait until time relay 51 closes its contacts which would effect the movement of the controller to position I and the connection of all of the load busses to the supply circuit A and then, if the total load still exceeded a predetermined value, to wait until the time relay 50 has had time to close its contacts before the controller would be able to move to position II and stop there.

We provide an arrangement, however, whereby if the voltage and load conditions are such that the controller should stop in either position II or III and the circuit breakers are not in their proper positions when the controller reaches the respective positions, the controller makes a predetermined number of revolutions during each of which it attempts to move the circuit breakers to the positions they should here occupy in accordance with the original voltage and load conditions existing at the time the controller reached the respective positions.

This result is obtained by means of the control relays 27' and 27'' which are energized each time the control relay 27 is energized. The control relay 27', when energized, completes a circuit for the control relay 5'' if a circuit is completed at the same time through the contacts and segments 5 and 6 of the controller so that the control relay 5 is energized. This circuit for the control relay 5'' is through the series connected contacts a of relays 44, 45 and 46, conductor 64, contacts of relay 5, coductor 6, contacts and segments 6 and 5 of the controller, conductor 5, control relay 5'', and contacts of relay 27'. Relay 5'' completes locking circuits for itself and for relays 5 and 5' which are independent of the controller contacts 5 and 6 so that these relays remain energized in position II of the controller if any circuit breaker is in the wrong position at that time. The locking circuit for relay 5'' is through the series connected contacts a of relays 44, 45 and 46, conductor 64, contacts of relay 5'', coil of relay 5'', and contacts of relay 27'. The locking circuit for relay 5 and 5' is through the series connected contacts a of relays 44, 45 and 46, conductor 64, contacts of relay 5'', conductor 5, and coils of relays 5 and 5' in series. As soon as the controller leaves position II, which it will do immediately because the relay 27 is energized, the controller contacts 5 and 6 are connected together again so that the heretofore described circuit for relays 5 and 5' is completed to insure that the controller moves around to position II again. Therefore if the voltage and load conditions are such that the controller should stop in position II and any one of the circuit breakers fails to be in the proper position when it reaches that position, the controller operates to complete a predetermined number of times the necessary circuits to place the circuit breakers in their proper positions irrespectively of any change in the position of the current relays 48 and 49 that may take place due to the faulty operation of the circuit breaker.

The control relay 27'' when energized, completes a circuit for the control relay 3'' if a circuit is completed at the same time through the controller contacts 3 and 4 so that the relay 3 is energized. This circuit for the control relay 3'' is through the series connected contacts a of relays 44, 45 and 46, conductor 64, contacts of relay 3, conductor 4, controller contacts and segments 4 and 3, conductor 3, coil of relay 3'', and contacts of relay 27''. Relay 3'' completes locking circuits for itself and for control relays 3 and 3' which are independent of the controller contacts 3 and 4 so that these relays remain energized in position III if any circuit breaker is in the wrong position at that time. The locking circuit for relay 3'' is through the series connected contacts a of relays 44, 45 and 46, conductor 64, contacts of relay 3'', coil of relay 3'', and contacts of relay 27''. The locking circuit for relays 3 and 3' is through the series connected contacts a of relays 44, 45 and 46, conductor 64, contacts of relay 3'', and coils of relays 3 and 3' in series. As soon as the controller leaves position III, which it will do immediately because the relay 27 is energized if any circuit breaker is in the wrong position, the controller connects together its contacts 3 and 4 so that the heretofore described circuit for the relays 3 and 3′ is again completed so as to insure that the controller will move to position III. Therefore, if the voltage and load conditions are such that the controller should stop in position III and any one of the circuit breakers fails to be in the proper position when the controller reaches that position, the controller operates to complete a predetermined number of times the necessary circuits to place the circuit breakers in their proper position irrespectively of any change in the positions of the current relays 48 and 49 which may take place due to the faulty operation of any circuit breaker.

While we have, in accordance with the patent statutes, shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is:—

1. In combination, a plurality of sources of current, a plurality of load busses, means responsive to predetermined electrical conditions of said sources and load circuits for selectively controlling the connection of certain of said load busses to different sources in accordance with said predetermined electrical conditions, and means operative in response to a predetermined abnormal condition of a source to effect the connection of each normal source to an independent load bus irrespectively of said predetermined electrical conditions.

2. In combination, a plurality of main sources of current, an auxiliary source of current, a plurality of load busses, means responsive to predetermined electrical conditions of said main sources and said load circuits for selectively controlling the connection of certain of said load busses to said main sources in accordance with said predetermined electrical conditions, and means operative in response to the failure of a main source to effect the connection of each normal main source to a predetermined independent load bus and the connection of said auxiliary source to the other load busses.

3. In combination, a plurality of main supply circuits, an auxiliary supply circuit, a plurality of load busses, means arranged selectively to control the connection of certain of said main supply circuits to certain of said load circuits under predetermined load conditions when all of said main supply circuits are energized, and means responsive to the failure of any one of said main supply circuits for controlling the connections between the other main supply circuits, said auxiliary supply circuit, and said load busses so that each of said last-mentioned supply circuits supplies an independent load bus.

4. In combination, a plurality of main sources of current, an auxiliary source of current, a plurality of load busses, load responsive means arranged to control the connections between said main sources of current and said load busses so that under predetermined load conditions all of said load busses are supplied from one of said main sources and under other predetermined load conditions each load bus is independently energized from a separate main source, and means responsive to a predetermined abnormal condition of a source for controlling the connections between said load busses and said sources so that irrespectively of the load conditions each normal main source independently supplies the same load bus that it independently supplies under said other predetermined load conditions and said auxiliary source supplies the other load bus.

5. In combination, three main supply circuits, three load busses, an auxiliary supply circuit, load responsive means arranged to control the connections between said load busses and said main supply circuits so that all of said load busses are supplied by one of said main supply circuits when the load is below a predetermined value and so that two of the load busses are supplied by one of said main supply circuits and the other load bus is supplied by another of said main supply circuits when the load exceeds said predetermined value but is below a predetermined higher value and so that each load bus is independently supplied by a separate main supply circuit when the load exceeds said predetermined higher value, and means responsive to the voltage failure of any one of said main supply circuits for controlling the connections between said load busses and said supply circuits so that each normal main supply circuit and said auxiliary source supply current independently to separate load busses irrespectively of the load.

6. In combination, three main supply circuits, three load busses, an auxiliary supply circuit, load responsive means arranged to control the connections between said load busses and said main supply circuits so that all of said load busses are supplied by one of said main supply circuits when the load is below a predetermined value and so that two of the load busses are supplied by one of said main supply circuits and the other load bus is supplied by another of said main supply circuits when the load exceeds said predetermined value, but is below a predetermined higher value, and so that each load bus is supplied by a separate main supply circuit when the load exceeds said predetermined higher value, and means responsive to the failure of any one of said main supply circuits for controlling the connections between said auxiliary circuit, said main supply circuits whose voltages are normal, and said load busses so that each normal main supply circuit independently supplies the same load bus that it supplies when the load exceeds said predetermined higher value and said auxiliary supply circuit supplies the other load busses.

7. In combination, two main sources of current, two load busses, an auxiliary source of current, load responsive means arranged to control the connection between said load busses and said main sources so that all of said load busses are supplied by one of said main sources under predetermined load conditions and so that each load bus is independently supplied from a different source under other predetermined load conditions and means responsive to the failure of either one of said main sources for controlling the connections between said load busses and said sources so that irrespectively of the load conditions one of said load busses is independently supplied by the main source which has not failed and the other load bus is independently supplied by the auxiliary source.

8. In combination, two main sources of current, two load busses, an auxiliary source of current, load responsive means arranged to control the connection between said load busses and said main sources so that all of said load busses are supplied by one of said main sources under predetermined load conditions and so that each load bus is independently supplied from a different predetermined main source under other predetermined load conditions, and means responsive to the failure of either one of said main sources for controlling the connections between said load busses and said sources so that irrespectively of the load conditions the main source which has not failed independently supplies the same load bus that it supplied under said other predetermined load conditions and said auxiliary source supplies the other load bus.

9. In combination, a plurality of sources of current, a plurality of load circuits, switching means between said sources and said load circuits, control means responsive to predetermined electrical conditions of said sources for selectively controlling said switching means, and means responsive to the failure of a switching means to function properly in response to the operation of said control means for effecting a predetermined number of attempts to cause the abnormal switching means to function in accordance with the predetermined electrical conditions.

10. In combination, a plurality of sources of current, a plurality of load circuits, switching means between said sources and said load circuits, control means responsive to predetermined electrical conditions of said sources for selectively controlling said switching means, and means responsive to the failure of a switching means to function properly in response to the operation of said control means for effecting a predetermined number of attempts to cause the abnormal switching means to function in accordance with the predetermined electrical conditions existing at the time the abnormal switching means failed to function and independently of a subsequent change in said electrical condition of said sources.

11. In combination, a plurality of sources of current, a plurality of load circuits, switching means between said sources and said load circuits, control means responsive to predetermined voltage and current conditions of said sources for selectively controlling said switching means, and means responsive to the failure of a switching means to function properly in response to the operation of said control means for effecting a predetermined number of attempts to cause the abnormal switching means to function in accordance with the predetermined voltage and current conditions.

12. In combination, a plurality of sources of current, a plurality of load circuits, switching means between said sources and said load circuit, time delayed load responsive means for selectively controlling said switching means, and means responsive to the failure of a switching means to function properly in response to the operation of said control means for effecting a predetermined number of attempts to cause the abnormal switching means to function in accordance with the load conditions existing at the time the switching means failed to function and independently of a subsequent change in the load conditions.

13. In combination, a plurality of sources of current, a plurality of load circuits, switching means between said sources and said load circuit, control means for selectively controlling said switching means, and means responsive to the failure of any one of said switching means to function in accordance with the operation of said control means for effecting a predetermined number of attempts to cause the abnormal switching means to function in accordance with the condition of the control means.

14. In combination, two sources of current, a load circuit, switching means for connecting each source to said load circuit, control means for selectively controlling said switching means, and means responsive to the failure of said switching means to function in accordance with the condition of said control means for effecting a predetermined number of attempts to cause the abnormal switching means to function in accordance with the condition of the control means at the time the abnormal switching means failed to function.

15. In combination, a plurality of sources of current, a load circuit, circuit breakers for connecting said sources to said load circuit, control means for selectively controlling said circuit breakers, and means responsive to the failure of a circuit breaker to function in accordance with the condition of said control means for effecting a predetermined number of attempts to cause said circuit breaker to function in accordance with said control means.

16. In combination, a plurality of sources of current, a plurality of load circuits, switching means between said sources and said load circuits, control means responsive to predetermined electrical conditions of said sources for selectively controlling said switching means, and means responsive to the failure of a switching means to function properly in response to the operation of said control means for effecting a predetermined number of attempts to cause the abnormal switching means to function in accordance with the predetermined electrical conditions and for effecting the operation of said switching means to establish predetermined connections between said sources and load circuits after said predetermined number of attempts to operate an abnormal switching means have been made.

17. In combination, a plurality of sources of current, a plurality of load circuits, switching means between said sources and said load circuits, control means responsive to predetermined electrical conditions of said sources for selectively controlling said switching means, and means responsive to the failure of a switching means to function properly in response to the operation of said control means for effecting a predetermined number of attempts to cause the abnormal switching means to function in accordance with the predetermined electrical conditions and for attempting to operate said switching means to establish a connection between each load circuit and a separate source after said predetermined number of attempts to operate an abnormal switching means have been made.

18. In combination, a plurality of sources of current, a load circuit, circuit breakers for connecting said sources to said load circuit, control means for selectively controlling said circuit breakers, and means responsive to the failure of a circuit breaker to function in accordance with the condition of said control means for effecting a predetermined number of attempts to cause said circuit breaker to function in accordance with said control means and for effecting the connection of another source to said load circuit after said predetermined number of attempts to operate the abnormal switching means have been made.

In witness whereof, we have hereunto set our hands March 14, 1927.
DONALD R. MacLEOD.
FREDERIC D. KING.
March 16, 1927.
EUGENE L. HOUGH.